United States Patent
Lee et al.

(10) Patent No.: US 9,219,281 B2
(45) Date of Patent: Dec. 22, 2015

(54) SEPARATOR FOR A FUEL CELL, A PRODUCTION METHOD THEREFOR AND A FUEL CELL STACK COMPRISING THE SAME

(75) Inventors: Sangmin Lee, Seoul (KR); Woon Bong Hwang, Pohang (KR)

(73) Assignee: POSTECH ACADEMY-INDUSTRY FOUNDATION, Pohang (KR)

( * ) Notice: Subject to any disclaimer, the term of this patent is extended or adjusted under 35 U.S.C. 154(b) by 822 days.

(21) Appl. No.: 13/498,479

(22) PCT Filed: Sep. 27, 2010

(86) PCT No.: PCT/KR2010/006544
§ 371 (c)(1),
(2), (4) Date: Mar. 27, 2012

(87) PCT Pub. No.: WO2011/037428
PCT Pub. Date: Mar. 31, 2011

(65) Prior Publication Data
US 2012/0183882 A1  Jul. 19, 2012

(30) Foreign Application Priority Data
Sep. 28, 2009 (KR) .......................... 10-2009-0091832

(51) Int. Cl.
*H01M 2/18* (2006.01)
*H01M 8/02* (2006.01)
(Continued)

(52) U.S. Cl.
CPC .......... *H01M 8/0206* (2013.01); *H01M 8/0228* (2013.01); *H01M 8/04156* (2013.01); *H01M 2008/1095* (2013.01); *Y02E 60/50* (2013.01)

(58) Field of Classification Search
CPC ................... H01M 2008/1095; H01M 8/0206; H01M 8/0228; H01M 8/04156; Y02E 60/50

USPC .................................................. 429/482, 508
See application file for complete search history.

(56) References Cited

U.S. PATENT DOCUMENTS

2007/0178357 A1* 8/2007 Vyas et al. ...................... 429/38
2008/0044716 A1   2/2008 Abd Elhamid
(Continued)

FOREIGN PATENT DOCUMENTS

CN   1708870    12/2005
CN   101009385   8/2007
(Continued)

OTHER PUBLICATIONS

English abstract WO 2007016779 A1, Troczynski et al., Feb. 2007, WIPO.*

(Continued)

*Primary Examiner* — Jonathan Jelsma
*Assistant Examiner* — Rashid Alam
(74) *Attorney, Agent, or Firm* — Lex IP Meister, PLLC

(57) ABSTRACT

The present invention provides a separator for a fuel cell that improves efficiency of the fuel cell by removing water generated in a membrane-electrode assembly and accumulated in a channel of the separator, a manufacturing method thereof, and a fuel cell stack including the same. The separator for the fuel cell of the present invention includes: a main body of a plate shape; a channel concavely formed in at least one surface of the main body and supplying a fuel or oxygen to a membrane-electrode assembly; and a metal layer provided to a surface of the channel and including an oxide layer formed by an anodic oxidation treatment and minute grooves of a nano-scale formed in the oxide layer, thereby forming the surface of the channel to be super-hydrophilic.

3 Claims, 15 Drawing Sheets

(51) Int. Cl.
*H01M 8/04* (2006.01)
*H01M 8/10* (2006.01)

(56) References Cited

U.S. PATENT DOCUMENTS

| | | | |
|---|---|---|---|
| 2009/0181278 A1* | 7/2009 | Son et al. | 429/30 |
| 2009/0214927 A1* | 8/2009 | Dadheech et al. | 429/34 |

FOREIGN PATENT DOCUMENTS

| | | |
|---|---|---|
| DE | 102007038174 | 2/2008 |
| DE | 102008006038 | 7/2009 |
| EP | 1326297 | 7/2003 |
| JP | 2945472 | 6/1993 |
| JP | 2002-151110 | 5/2002 |
| KR | 10-2003-0034109 | 5/2003 |
| KR | 10-2006-0058367 | 5/2006 |
| WO | WO 2007016779 A1 * | 2/2007 |

OTHER PUBLICATIONS

Shi, et al., "Fabrication of Iron Magnetic Nanowires in Anodic Aluminium Oxide Templates", Chemical Industry Times, vol. 18, No. 12, (Dec. 12, 2004).
Chinese Patent Office, Search Report dated Dec. 19, 2013, which was attached to the Office Action dated Dec. 27, 2013, of the corresponding Chinese Patent Application No. 201080043051.2.
European Patent Office, Search Report dated Dec. 16, 2013, of the corresponding European Patent Application No. 10819069.5.

* cited by examiner

SEPARATOR FOR A FUEL CELL, A PRODUCTION METHOD THEREFOR AND A FUEL CELL STACK COMPRISING THE SAME

BACKGROUND OF THE INVENTION (a) Field of the Invention

The present invention relates to a fuel cell stack. More particularly, the present invention relates to a separator positioned closely adjacent to a membrane-electrode assembly and a manufacturing method thereof.

(b) Description of the Related Art

In general, a fuel cell is a device that generates electrical energy by an oxidation reaction of a fuel and a reduction reaction of oxygen that is separately supplied. The fuel is a liquid or a gas fuel, or may include hydrogen cracked from the liquid fuel or the gas fuel.

A fuel cell stack is a structure in which several to several tens of electricity generation units each including a membrane-electrode assembly and a separator are stacked. The separator is disposed on both sides of the membrane-electrode assembly and forms a channel to supply the fuel or oxygen to one surface toward the membrane-electrode assembly. Also, the separator is formed of a conductive material and couples a cathode of one membrane-electrode assembly and an anode of the neighboring membrane-electrode assembly in series.

Under an operation of the fuel cell stack, water is generated by the reduction reaction of oxygen by the cathode in the membrane-electrode assembly. However, this water is not smoothly exhausted to the outside through the channel of the separator but is deposited on an inner wall of the channel. The water that is formed in the separator disturbs the mobility of hydrogen and oxygen such that oxygen may not be smoothly provided to the cathode of the membrane-electrode assembly, and as a result, chemical reaction efficiency of the fuel cell is largely deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a separator for a fuel cell that improves chemical reaction efficiency of the fuel cell by directly absorbing water generated in a membrane-electrode assembly to a channel surface without accumulating, a manufacturing method thereof, and a fuel cell stack including the same.

A separator for a fuel cell according to an exemplary embodiment of the present invention includes: a main body of a plate shape; a channel concavely formed in at least one surface of the main body and supplying a fuel or oxygen to a membrane-electrode assembly; and a metal layer provided to a surface of the channel and including an oxide layer formed by an anodic oxidation treatment and minute grooves of a nano-scale formed in the oxide layer, thereby forming the surface of the channel to be super-hydrophilic.

The metal layer may include minute protrusions and depressions of a micro-scale, and the oxide layer and the minute grooves may be formed according to the minute protrusions and depressions. The minute grooves may have a diameter of 20 nm to 200 nm and an aspect ratio of 10 to 2000.

The main body may form a fuel manifold and an oxygen manifold, and the channel is connected to one of the fuel manifold and the oxygen manifold. The channel may be formed at both surfaces of the main body, the channel formed at one surface of the main body may be connected to one of the fuel manifold and the oxygen manifold, and the channel formed at the other surface of the main body may be connected to the other of the fuel manifold and the oxygen manifold.

A manufacturing method of a separator for a fuel cell according to an exemplary embodiment of the present invention includes forming a concave channel in at least one surface of a main body; forming a metal layer at the surface of the channel; and performing an anodic oxidation treatment to the metal layer to form minute grooves of a nano scale thereby forming the surface of the channel to be super-hydrophilic.

The method may further includes forming a mask layer at the surface of the main body except for the channel before forming the metal layer, and removing the mask layer after forming the minute grooves.

The method may further include injecting minute particles to the metal layer to form minute protrusions and depressions of a micro-scale at the surface of the metal layer after forming the metal layer.

The minute particles may be hydrosoluble minute particles, and dry ice may also be injected when injecting the hydrosoluble minute particle to generate moisture at the surface of the metal layer. The minute particles may have a diameter of 10 μm to 50 μm.

A fuel cell stack according to an exemplary embodiment of the present invention includes an electricity generation unit having a membrane-electrode assembly and a separator positioned closely adjacent to both surfaces of the membrane-electrode assembly. The separator includes: a main body of a plate shape; a channel concavely formed in at least one surface of the main body and supplying a fuel or oxygen to a membrane-electrode assembly; and a metal layer provided to a surface of the channel and including an oxide layer formed by an anodic oxidation treatment and minute grooves of a nano-scale formed in the oxide layer, thereby forming the surface of the channel to be super-hydrophilic.

According to an exemplary embodiment of the present invention, the separator for the fuel cell forms the channel having the super-hydrophilic surface such that water drops generated in the membrane-electrode assembly are directly absorbed, thereby efficiency transmitting the fuel and the air. As a result, the chemical reaction efficiency of the fuel cell stack is increased such that more electrical energy may be generated.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
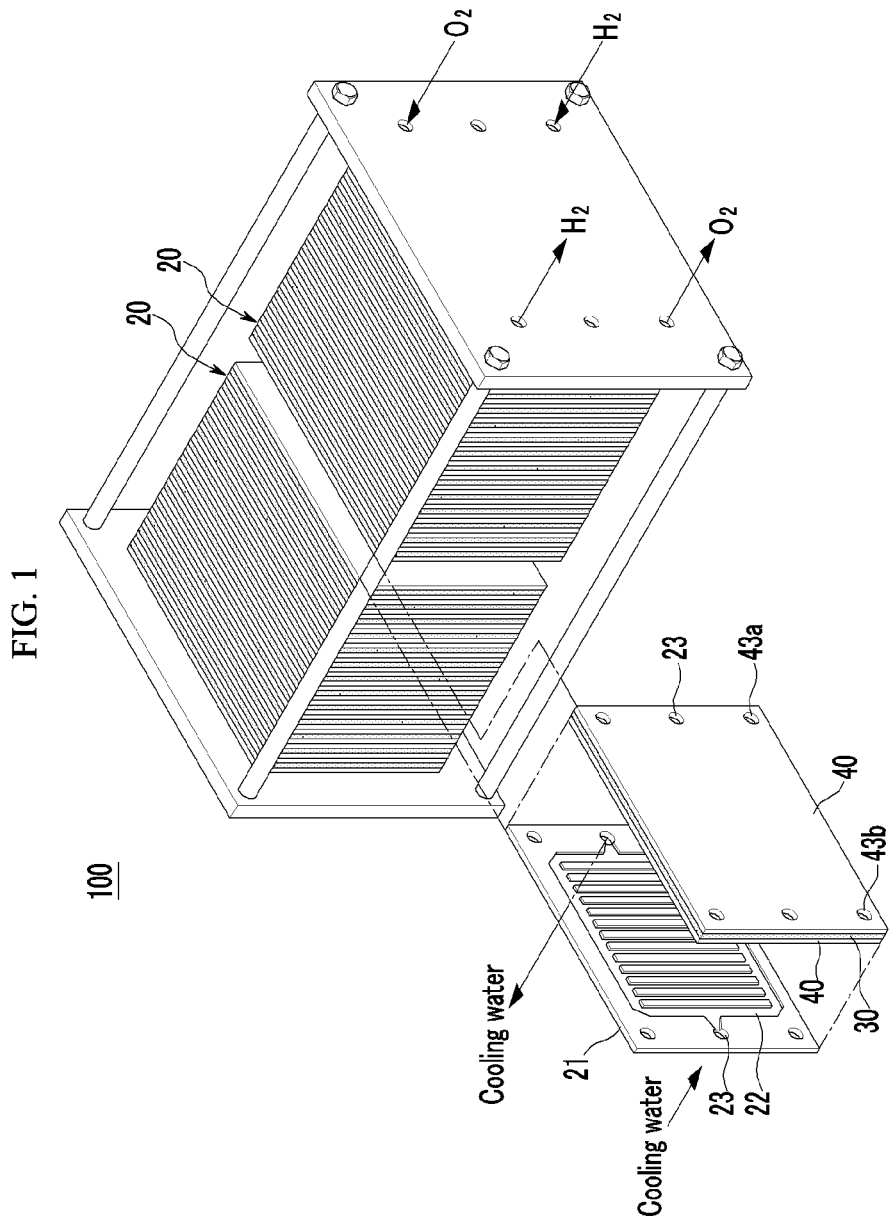
FIG. 1 is a perspective view of a fuel cell stack according to an exemplary embodiment of the present invention.

FIG. 1 is a perspective view of a fuel cell stack according to an exemplary embodiment of the present invention.

Referring to FIG. 1, a fuel cell stack 100 includes a plurality of electricity generation units 20 as cell units for electrochemically reacting a fuel and oxygen to generate electrical energy. That is, a plurality of electricity generation units 20 are continuously disposed and coupled in series to each other thereby forming the fuel cell stack 100.

The fuel may be a liquid fuel or a gas fuel including hydrogen such as methanol, ethanol, liquefied petroleum gas (LPG), liquefied natural gas (LNG), and gasoline. In this case, the fuel cell stack 100 is formed as a direct oxidation fuel cell type generating electrical energy by a direct reaction of the liquid fuel or the gas fuel and oxygen.

Meanwhile, the fuel may include hydrogen cracked from the liquid fuel or the gas fuel through a general reformer. In this case, the fuel cell stack 100 is formed as a polymer electrode membrane fuel cell type generating electrical energy by a reaction of hydrogen and oxygen.

Figure 2:
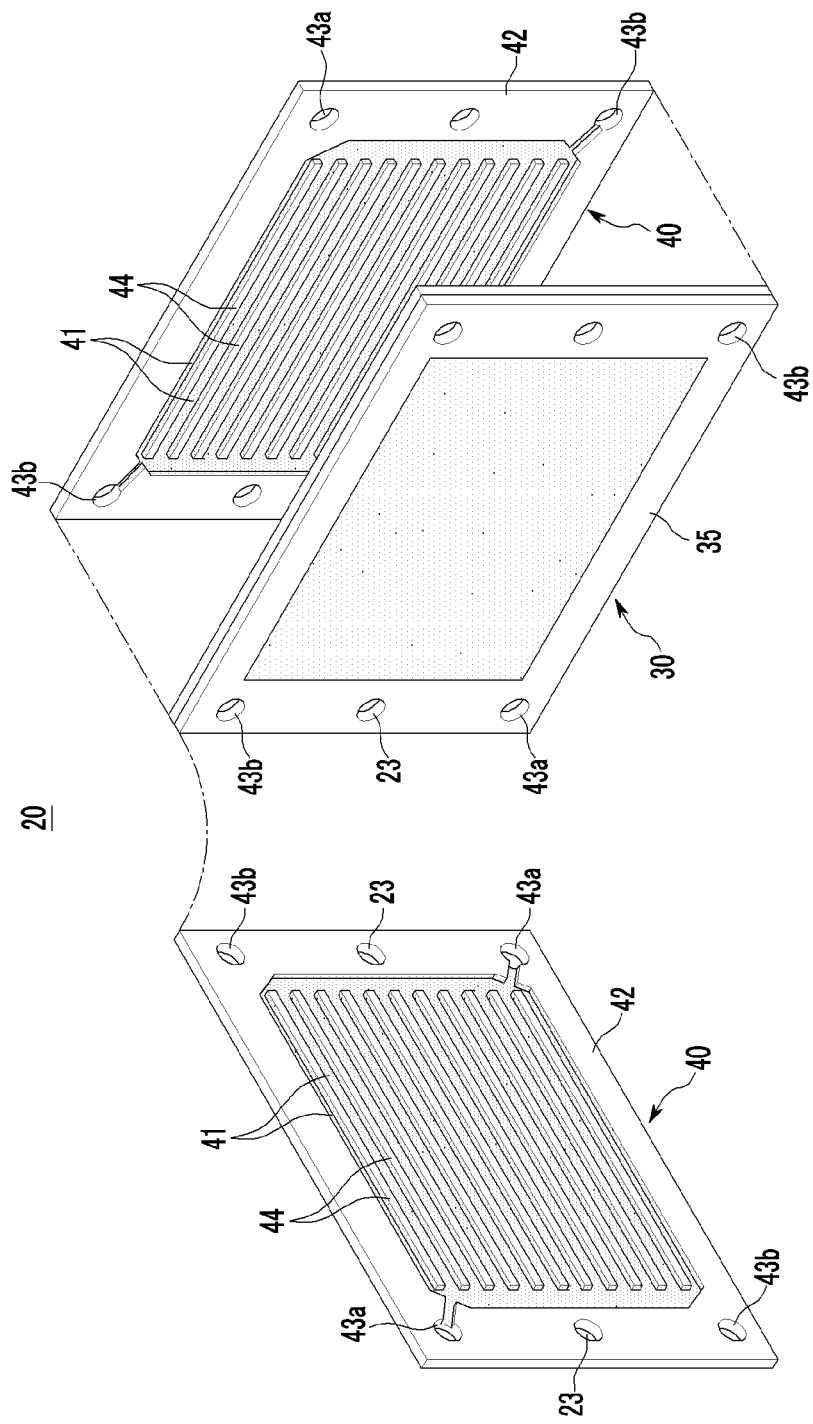
FIG. 2 is an exploded perspective view of an electricity generation unit of the fuel cell stack shown in FIG. 1.

FIG. 2 is an exploded perspective view showing an electricity generation unit in the fuel cell stack shown in FIG. 1. Referring to FIG. 1 and FIG. 2, the electricity generation unit 20 includes a membrane-electrode assembly 30 and a pair of separators 40 positioned closely adjacent to both surface of the membrane-electrode assembly 30.

Figure 3:
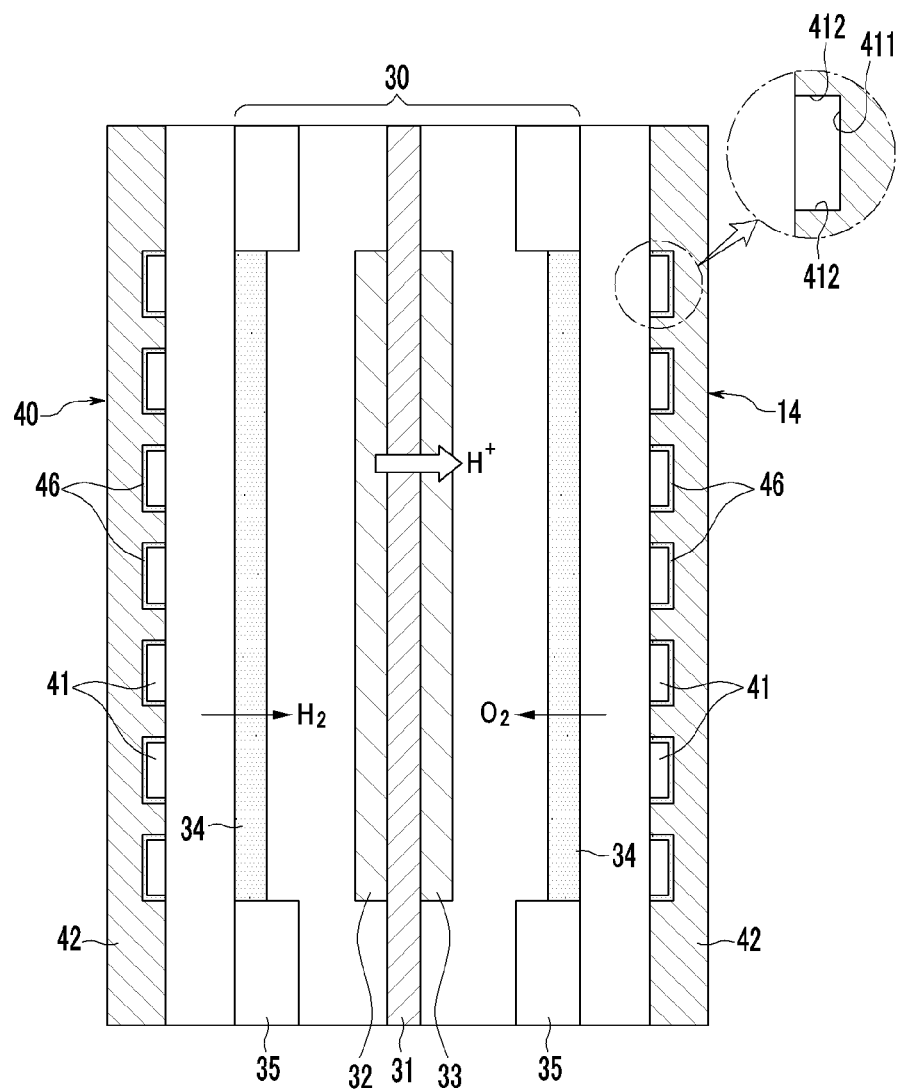
FIG. 3 and FIG. 4 show disassembled and assembled cross-sectional views of the electricity generation unit shown in FIG. 2.
Figure 4:
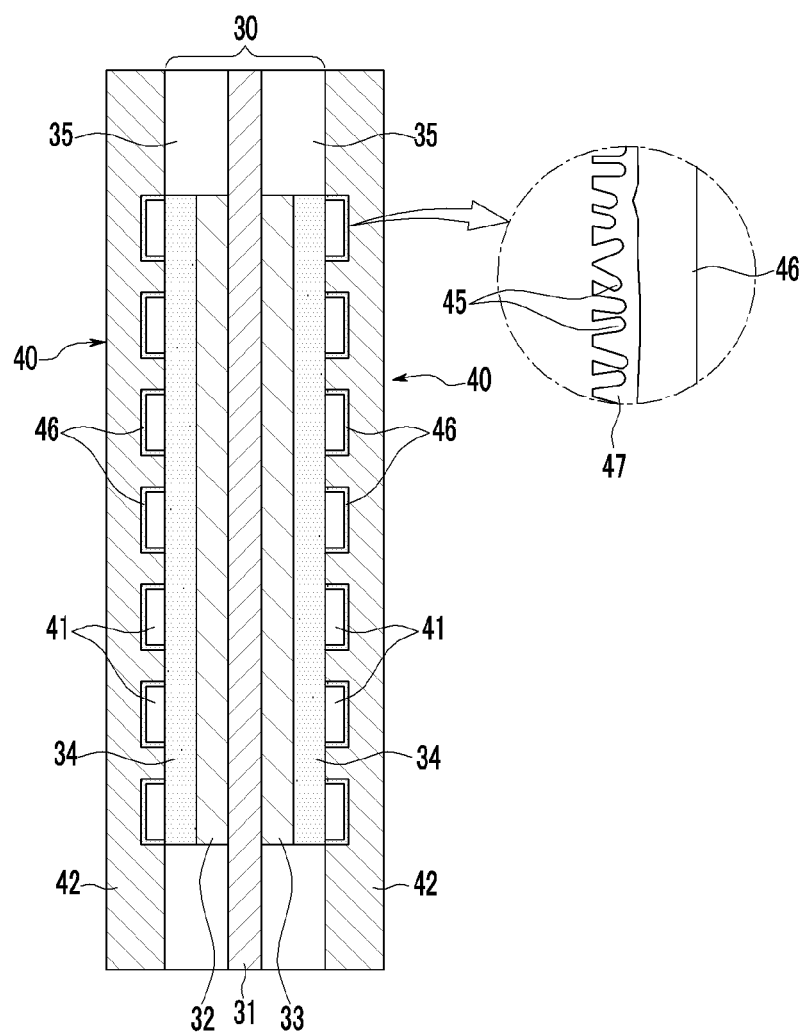

FIG. 3 is a disassembled cross-sectional view of the electricity generation unit shown in FIG. 2, and FIG. 4 is an assembled cross-sectional view of the electricity generation unit shown in FIG. 2. Referring to FIG. 3 and FIG. 4, the membrane-electrode assembly 30 includes an electrolyte layer 31, an anode 32 positioned at one surface of the electrolyte layer 31, a cathode 33 positioned at the other surface of the electrolyte layer 31, and a gas diffusion layer 34 positioned at outer surfaces of the anode 32 and the cathode 33.

The anode 32 divides the provided fuel into electrons and protons, and the electrolyte layer 31 moves the protons to the cathode 33. The cathode 33 reacts the electrons and protons transmitted from the electrolyte layer 31 and separately provided oxygen to generate moisture and heat. The gas diffusion layer 34 has a function of uniformly supplying the fuel to the anode 32 and the oxygen to the cathode 33.

A gasket 35 is positioned according to an edge of the membrane-electrode assembly 30. The gasket 35 supports the membrane-electrode assembly 30 and maintains air-tightness between the separator 40 and the membrane-electrode assembly 30. The gasket 35 may be made of silicon rubber having elasticity or a polymer material such as PET.

The separators 40 disposed at both surfaces of the membrane-electrode assembly 30 have functions of supporting and dispersing the fuel to the anode 32 and the oxygen to the cathode 33. For this, the separator 40 includes a channel 41 to receive the fuel or oxygen and to uniformly supply them to the membrane-electrode assembly 30.

Referring to FIG. 1 and FIG. 2, the separator 40 includes a main body 42 of a plate shape, the channel 41 concavely formed at one surface of the main body 42 toward the membrane-electrode assembly 30 and providing a moving path for the fuel or oxygen, and manifolds 43a and 43b connected to the channel 41 while being positioned at the edge of the main body 42 and supplying the fuel or oxygen to the channel 41. The main body 42 may be made of a carbon material such as graphite, or a metal.

The manifolds 43a and 43b include a pair of fuel manifolds 43a providing the fuel and a pair of oxygen manifolds 43b supplying oxygen. The channel 41 of the separator 40 facing the anode 32 is connected to a pair of fuel manifolds 43a, and the channel 41 of the separator 40 facing the cathode 33 is connected to a pair of oxygen manifolds 43b. In FIG. 2, the separator 40 facing the anode 32 is shown at the left side and the separator 40 facing the cathode 33 is shown at the right side.

FIG. 2 shows an example of the separator 40 of a structure in which a plurality of ribs 44 are disposed with an interval therebetween at one surface of the main body 42 toward the membrane-electrode assembly 30 thereby forming a plurality of channels 41 between the ribs 44, and ends of the channels 41 are connected to each other. However, the shape of the channel 41 is not limited to the above-described example, and all shapes that are capable of providing the moving path of the fuel or oxygen may be applied.

Referring to FIG. 3 and FIG. 4, for the above-described electricity generation unit 20, a metal layer 46 including minute grooves 45 of a nano-scale and forming the surface of the channel 41 with a super-hydrophilicity is positioned on the surface of the channel 41. Here, the surface of the channel 41 means the entire surface of the channel 41 including a bottom surface 411 and a side surface 412 (shown in an enlarged circle of FIG. 3), and the nano-scale means a size range of more than 1 nm and less than 1000 nm.

An oxide layer 47 is formed at the surface of the metal layer 46, and the minute grooves 45 of the nano-scale are positioned at the oxide layer 47. The oxide layer 47 and the minute grooves 45 are formed through an anodic oxidation process that will be described later. The metal layer 46 may be formed of aluminum, and the oxide layer 47 may be formed of aluminum oxide.

A general metal is a hydrophilic material having a contact angle with a liquid of less than 90°. If the minute grooves 45 of the nano-scale are formed at the surface of the metal layer 46, the contact angle is decreased to less than 5° such that the hydrophilicity is maximized.

In the present exemplary embodiment, the minute grooves 45 may have a diameter of 20 nm to 200 nm and an aspect ratio in a range of more than 10 to less than 2000. When the diameter of the minute grooves 45 is large, the aspect ratio is high so as to present good hydrophilicity, however if the aspect ratio is less than 10, the hydrophilicity is weak. When the diameter of the minute grooves 45 is small, the hydrophilicity causes the aspect ratio to be large, however the hydrophilicity is not largely enhanced if the aspect ratio is over 2000, so when considering process time, it is preferable for the aspect ratio of the minute grooves 45 to be less than 2000.

As described above, the channel 41 including the metal layer 46 has a super-hydrophilic surface because of the minute grooves 45 such that water generated in the membrane-electrode assembly 30 during fuel cell operation is deposited to the channel 41 and is directly absorbed to the surface of the channel 41 formed with the minute grooves 45.

Accordingly, the separator 40 may smoothly provide the fuel and oxygen to the anode 32 and the cathode 33 while minimizing a moving disturbance of the fuel and hydrogen, and as a result, chemical reaction efficiency of the fuel cell may be increased. The metal layer 46 is formed on the entire surface of the channel 41 and is not provided to the surface of the rib 44 positioned close to the membrane-electrode assembly 30.

Figure 5:
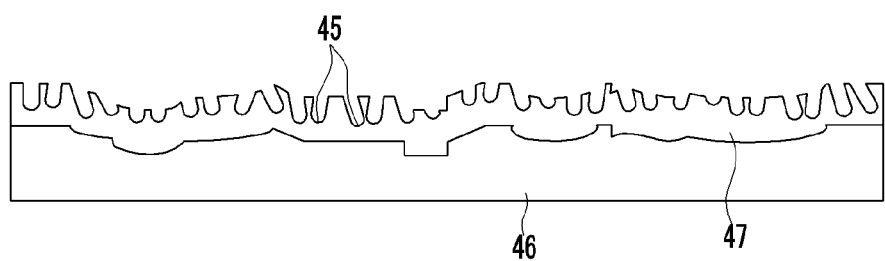
FIG. 5 is an enlarged cross-sectional view according to another exemplary embodiment of a metal layer shown in FIG. 4.

FIG. 5 is an enlarged cross-sectional view according to another exemplary embodiment of the metal layer shown in FIG. 4.

Referring to FIG. 5, the metal layer 46 forms minute protrusions and depressions of a micro-scale. Also, the oxide layer 47 is formed according to the minute protrusions and depressions of the micro-scale, and thereby the minute grooves 45 of the nano-scale are formed on the surface thereof. Here, the micro-scale means a size included in a range of more than 1 μm to less than 1000 μm.

The minute protrusions and depressions of the micro-scale have a function of increasing the hydrophilicity of the surface of the channel 41. The minute protrusions and depressions may be formed by a method of injecting minute particles to the surface of the metal layer 46 by using compressed air pressure. That is, the surface of the metal layer 46 is changed by collision energy of the minute particles, thereby forming the minute protrusions and depressions of the micro-size.

Meanwhile, the fuel cell stack 100 generates heat during operation, and as shown in FIG. 1, a cooling plate 21 providing cooling water to the electricity generation unit 20 may be provided. The cooling plate 21 forms a channel 22 for moving the cooling water at one surface thereof. A cooling water manifold 23 supplying the cooling water is formed at the edge of the cooling plate 21, the separator 40, and the gasket 35, and the channel 22 of the cooling plate 21 is connected to the cooling water manifold 23.

Figure 6:
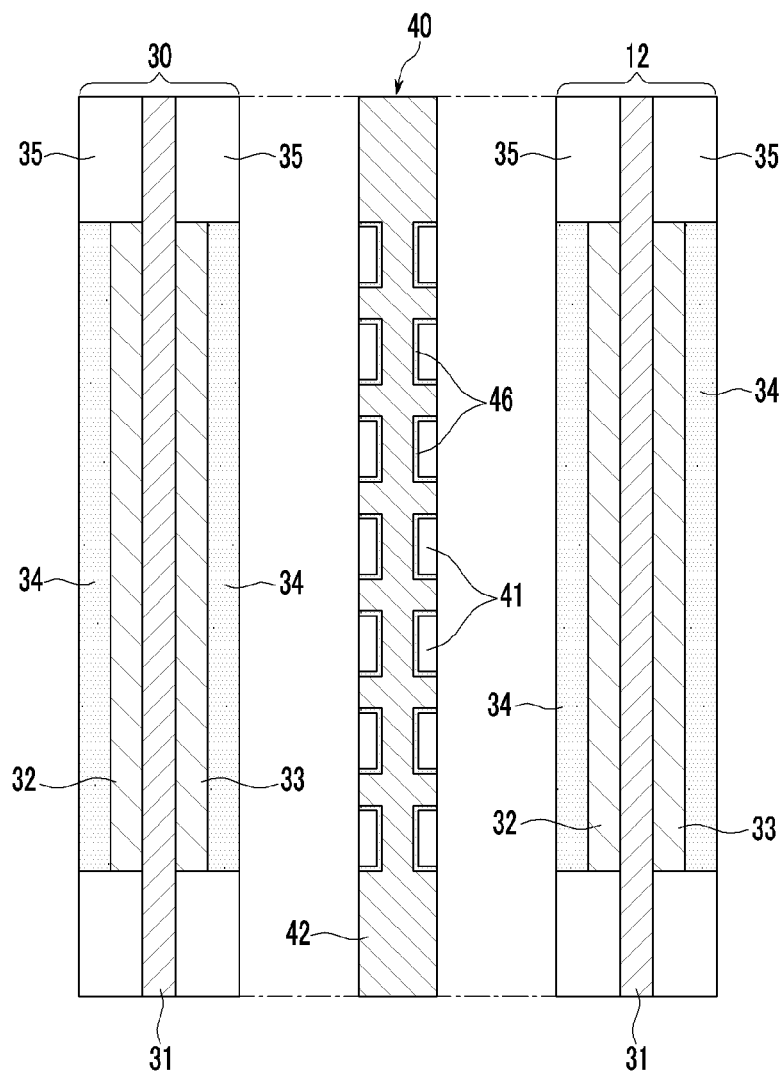
FIG. 6 is a cross-sectional view according to another exemplary embodiment of the electricity generation unit shown in FIG. 4.

One membrane-electrode assembly 30 and two separators 40 may form one electricity generation unit 20. Meanwhile, as shown in FIG. 6, channels 41 are formed at both surfaces of the separator 40, thereby one separator 40 is disposed between two neighboring membrane-electrode assemblies 30. In this case, the metal layer 46 including the minute grooves of the nano-scale is formed on the surface of the channels 41 to form the surface of the channels 41 having super-hydrophilicity.

Figure 7:
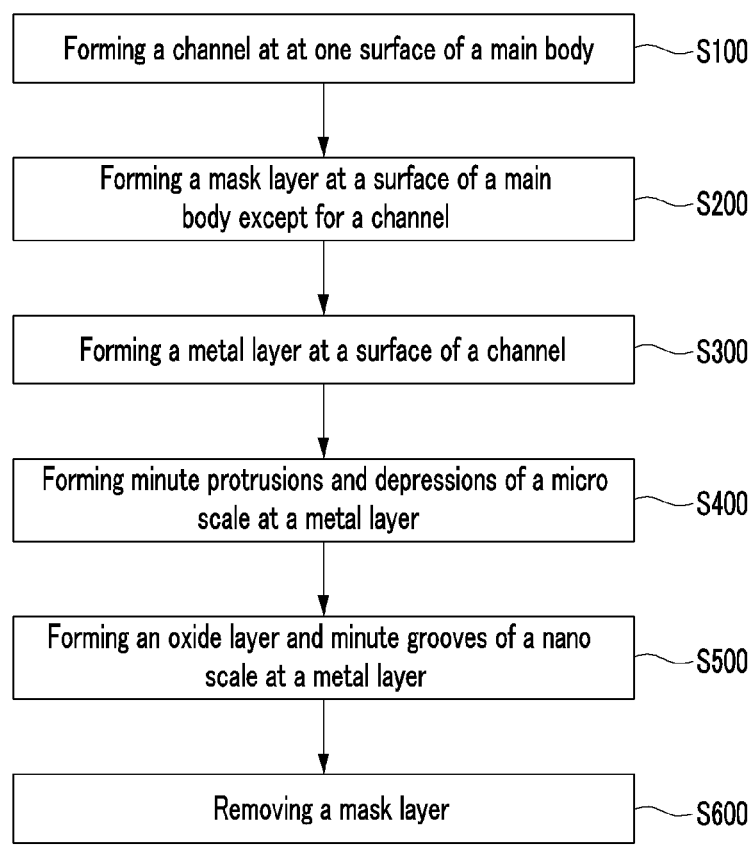
FIG. 7 is a process flowchart of a manufacturing method of a separator for a fuel cell according to an exemplary embodiment of the present invention.

Next, a manufacturing method of the separator for the fuel cell will be described. FIG. 7 is a process flowchart of a manufacturing method of a separator for a fuel cell according to an exemplary embodiment of the present invention.

Referring to FIG. 7, a manufacturing method of the separator for the fuel cell includes a first step S100 of forming a concave channel in at least one surface of the main body, a second step S200 of forming a mask layer on the surface of the main body except for the channel, a third step S300 of depositing a metal on the surface of the channel to form a metal layer, a fourth step S400 of injecting minute particles to the metal layer to form minute protrusions and depressions of the micro-scale, a fifth step S500 of forming an oxide layer and minute grooves of the nano-scale through an anodic oxidation treatment of the metal layer, and a sixth step S600 of removing the mask layer. If necessary, the fourth step S400 may be omitted.

Figure 8:
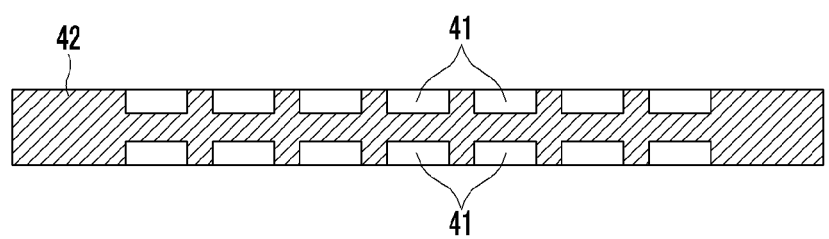
FIG. 8 is a cross-sectional view showing the separator of the first step shown in FIG. 7.

FIG. 8 is a cross-sectional view showing the separator of the first step shown in FIG. 7.

Referring to FIG. 8, a main body 42 made of a carbon material or a metal is manufactured. In the case of the carbon material, the main body 42 may be manufactured by an extrusion molding method using a mold, and a convex portion corresponding to the shape of the channel 41 is formed to simultaneously form the main body 42 and the channel 41. In the case of the metal, the main body 42 is processed through a stamping process to form a concave channel 41.

Figure 9:
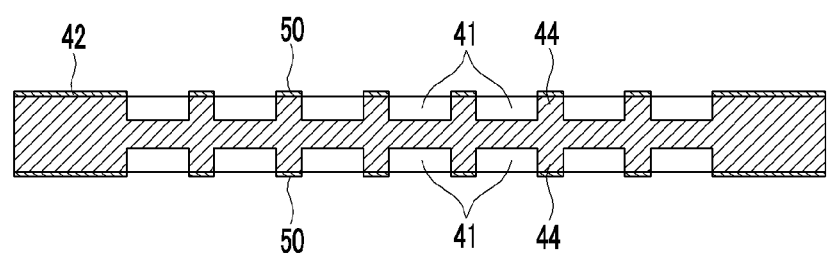
FIG. 9 is a cross-sectional view showing the separator of the second step shown in FIG. 7.

FIG. 9 is a cross-sectional view showing the separator of the second step shown in FIG. 7.

Referring to FIG. 9, a mask layer 50 is formed on the surface of the main body 42 except for the channel 41. That is, the mask layer 50 is formed on the entire surface of the ribs 44 facing the membrane-electrode assembly 30 such that only the channel 41 is exposed outside. By covering the surface of the ribs 44 with the mask layer 50, in the third step S300 and the following fourth step S400, minute protrusions and depressions and minute grooves may only be formed in the surface of the channel 41.

Figure 10:
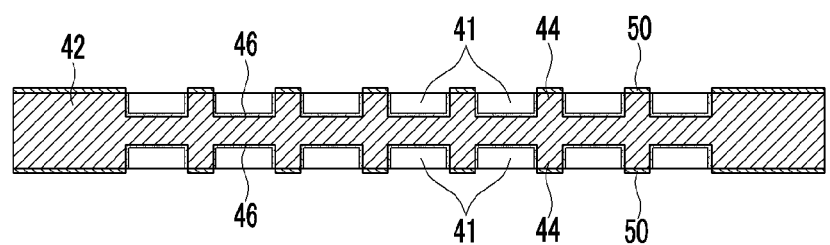
FIG. 10 is a cross-sectional view showing the separator of the third step shown in FIG. 7.

FIG. 10 is a cross-sectional view showing the separator of the third step shown in FIG. 7.

Referring to FIG. 10, a metal such as aluminum is deposited on the surface of the channel 41 to form a metal layer 46. At this time, the ribs 44 are covered by the mask layer 50 such that the metal layer 46 is not formed on the surface of the ribs 44.

Figure 11A:
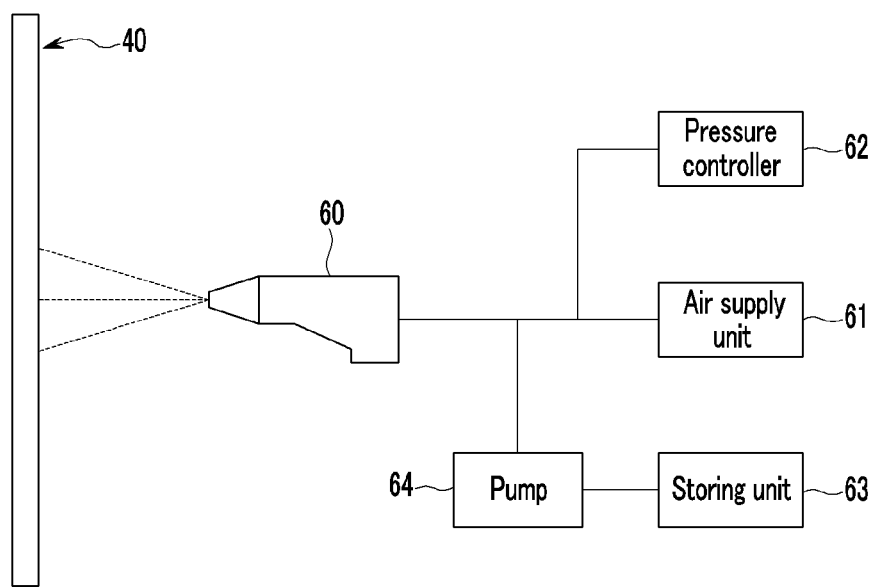
FIG. 11A is a schematic diagram showing an injector used in the fourth step of FIG. 7.
Figure 11B:
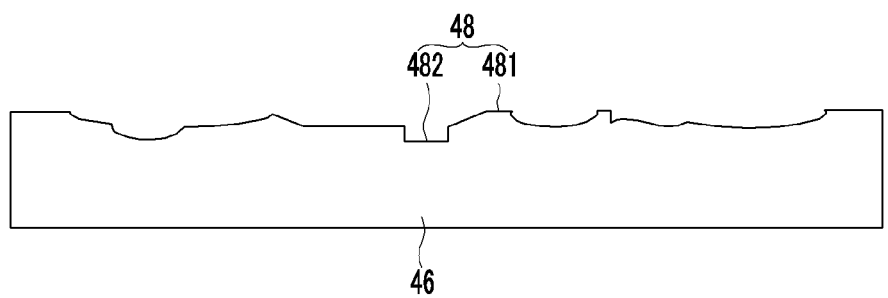
FIG. 11B is an enlarged cross-sectional view showing a metal layer after the fourth step.

FIG. 11A is a schematic diagram showing an injector used in the fourth step of FIG. 7, and FIG. 11B is an enlarged cross-sectional view showing a metal layer after the fourth step.

Referring to FIG. 11A and FIG. 11B, an injector 60 injects minute particles with a predetermined speed toward the metal layer 46 of the separator 40. The injector 60 may be a pneumatic injector using compressed air pressure, and may control injection speed and injection pressure of the minute particles by controlling a pressure of the air. In this case, the injector 60 may be connected to an compressed air supply unit 61, a pressure controller 62 controlling the pressure of the air, a storing unit 63 storing the minute particles 63, and a pump 64 supplying the minute particles to the injector 60.

The minute particles collide with the surface of the metal layer 46 thereby causing deformation of the surface of the metal layer 46. As a result, minute protrusions and depressions 48 of the micro-scale are formed in the surface of the metal layer 46. The minute particles may be metal balls, sand particles, or sodium hydrogen carbonate particles, referred to as baking soda. The minute particles may have a diameter of 10 μm to 50 μm. If the size of the minute particles is less than 10 μm, it is difficult to form the minute protrusions and depressions 48 of the micro-scale, and if the size is over 50 μm, the size of the minute protrusions and depressions 48 is increased such that the hydrophilicity of the metal layer 46 is deteriorated.

In the case that the minute particles are hydrosoluble sodium hydrogen carbonate particles, the minute particles are injected to form the minute protrusions and depressions 48, and then the metal layer 46 is cleaned with water such that the minute particles attached to the surface of the metal layer 46 may be easily removed. The metal layer 46 may be cleaned at least once if necessary in the middle process of the fourth step S400. If the hydrosoluble minute particles are used, foreign materials remaining on the surface of the metal layer 46 may be effectively suppressed.

Also, the hydrosoluble minute particles and dry ice may be injected together using the injector 60. When the dry ice collides with the surface of the metal layer 46, moisture is generated because of the temperature difference with the metal layer 46, and the hydrosoluble minute particles are dissolved by this moisture. Also, the mixture of the water and the hydrosoluble minute particles may be easily removed from the surface of the metal layer 46 by using injection pressure of the injector 60. Accordingly, a water cleaning process for the metal layer 46 may be omitted such that the entire process may be simplified.

The size of the minute protrusions and depressions 48, that is, a height of a protrusion portion 481, a depth of the depression portion 482, or an interval between the protrusion portions 481 may be changed according to the kind of minute particles, the diameter, the injection speed, and the injection pressure, and the shape of the minute protrusions and depressions 48 may be controlled by appropriately controlling these.

Figure 12:
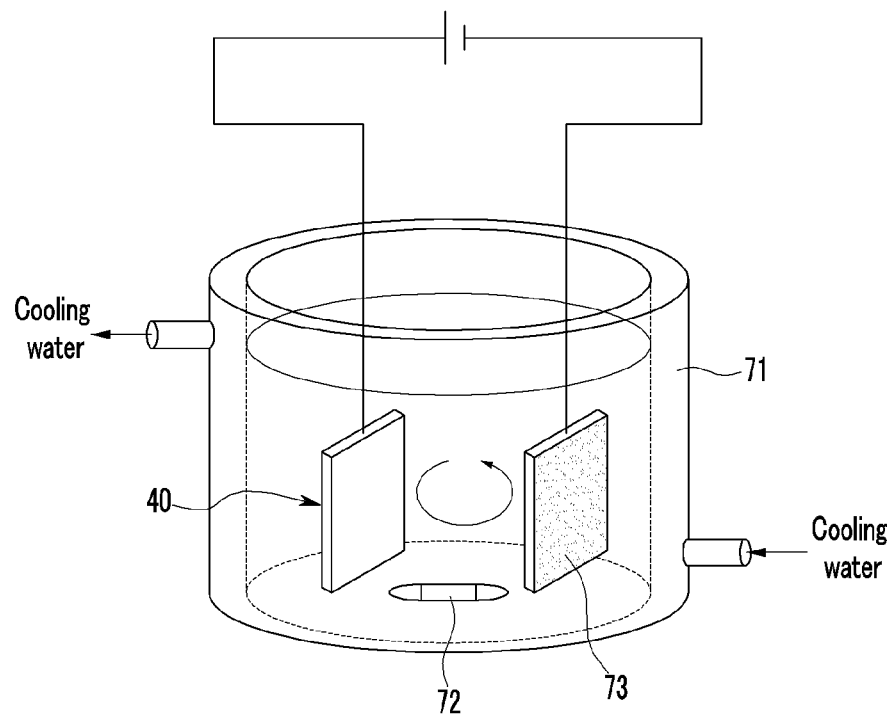
FIG. 12 is a schematic diagram showing an anodic oxidation device used in the fifth step of FIG. 7.

FIG. 12 is a schematic diagram showing an anodic oxidation device used in the fifth step of FIG. 7.

Referring to FIG. 12, the anodic oxidation device 70 includes a circulation bath 71 in which cooling water is circulated, and a magnetic agitator 72 agitating an electrolyte solution in the bath 71 at a predetermined speed. The channels of the separator 40 and a counter electrode 73 are soaked to the electrolyte solution in the bath 71, and the separator 40 and the counter electrode 73 are respectively applied with a positive voltage and a negative voltage to perform the anodic oxidation process. The electrolyte solution may include phosphoric acid ($H_3PO_4$) or oxalic acid ($C_2H_2O_4$), and the counter electrode 73 may be platinum (Pt) or aluminum (Al).

For example, the minute grooves 45 may be formed through an anodic oxidation treatment for 110 minutes in the electrolyte solution under the conditions of 0.3 M of oxalic acid, a 40 V voltage, and a 15° C. temperature. Next, the anodic oxidation treatment may be performed for 10 minutes in the electrolyte solution under the conditions of 0.1 M of phosphoric acid, 165 V to a 195 V voltage, and a 0.1° C. to 2° C. temperature to expand the diameter of the minute grooves 45.

The fourth step S400 may be omitted, and the metal layer 46 may directly undergo the anodic oxidation treatment. In this case, the anodic oxidation treatment is performed for 24 hours in the electrolyte solution under the conditions of 0.3 M of oxalic acid, a voltage of 40V, and a temperature of 24° C. to 30° C. 24, thereby forming the oxide layer 47 and the minute grooves 45 on the metal layer 46.

Referring to FIG. 5, while performing the anodic oxidation process, the oxide layer 47 is formed on the surface of the metal layer 46 and the minute grooves of the nano-scale are formed in the oxide layer 47. The oxide layer 47 and the minute grooves 45 are formed according to the minute protrusions and depressions. The diameter and depth of the minute grooves 45 may be controlled by controlling the concentration of the electrolyte solution, the application voltage intensity, or the etching time.

As described above, after the minute grooves 45 or the minute protrusions and depressions 48 and the minute grooves 45 are formed in the metal layer 46, the mask layer 50 is removed to remove the separators 40.

Figure 13:
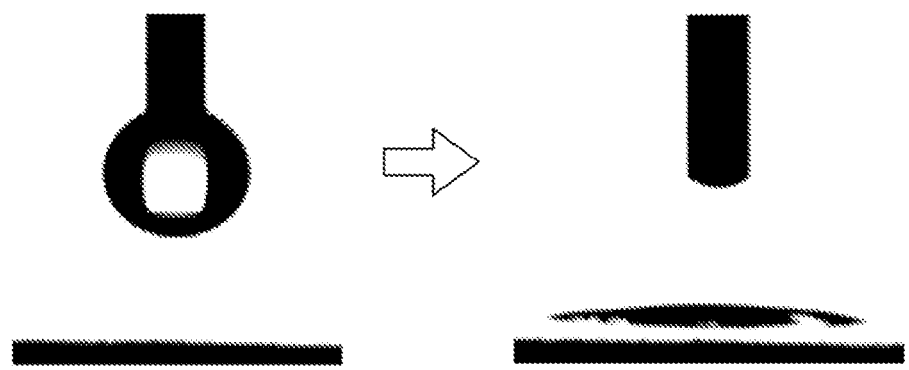
FIG. 13 and FIG. 14 are photos showing experimental results of a contact angle formed by dripping a water drop on a surface of a metal layer.
Figure 14:
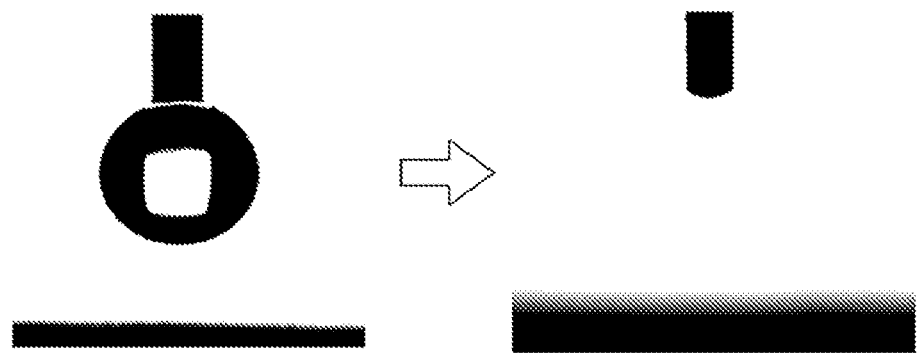

FIG. 13 is a view showing an experimental result of a contact angle formed by dripping a water drop on a surface of a metal layer for a separator in which minute protrusions and depressions and minute grooves are formed in a metal layer, and FIG. 14 is a view showing an experimental result of a contact angle formed by dripping a water drop on a surface of a metal layer for a separator in which minute grooves are only formed in a metal layer.

In FIG. 13 and FIG. 14, the left view shows a state before the water drop is dripped, and the right view shows a state after the water drop is dripped. The bar in the upper part of the drawing represents an apparatus used to drip the water drop. Referring to FIG. 13 and FIG. 14, when the minute protrusions and depressions and the minute grooves are formed together in the metal layer, an immediate low contact angle of less than about 5° may be obtained, and when the minute grooves are only formed in the metal layer, the water drop is absorbed as soon as it touches the metal layer.

As described above, the separator of the present exemplary embodiment forms a channel having a super-hydrophilic surface such that the water is directly absorbed in the membrane-electrode assembly, and thereby the efficiency of transmitting the fuel and the air is improved. As a result, the chemical reaction efficiency of the fuel cell stack is increased such that a large amount of electrical energy may be generated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a separator for a fuel cell, comprising:
    forming a concave channel in at least one surface of a main body;
    forming a metal layer at the surface of the channel;
    injecting minute particles to the metal layer to form minute protrusions and depressions of a micro-scale at the surface of the metal layer; and
    performing an anodic oxidation treatment to the metal layer to form an oxide layer and minute grooves of a nano-scale on the oxide layer thereby forming the surface of the channel to be hydrophilic,
    wherein the minute particles are hydrosoluble minute particles, and dry ice is also injected when injecting the hydrosoluble minute particle to generate moisture at the surface of the metal layer.

2. The method of claim 1, further comprising:
    before forming the metal layer, forming a mask layer at the surface of the main body except for the channel; and
    after forming the minute grooves, removing the mask layer.

3. The method of claim 1, wherein the minute particles have a diameter of 10 μm to 50 μm.

* * * * *